3,536,693
PROCESS FOR PREPARING POLYETHYLENE
HAVING IMPROVED PROPERTIES
Robert J. Schrader, Jesse R. Goza, Jr., and Jerald G. Park, Longview, Tex., assignors to Eastman Kodak Company, Rochester, N.Y., a corporation of New Jersey
Filed Jan. 31, 1968, Ser. No. 702,123
Int. Cl. C08f 1/60, 1/80, 3/04
U.S. Cl. 260—94.9    9 Claims

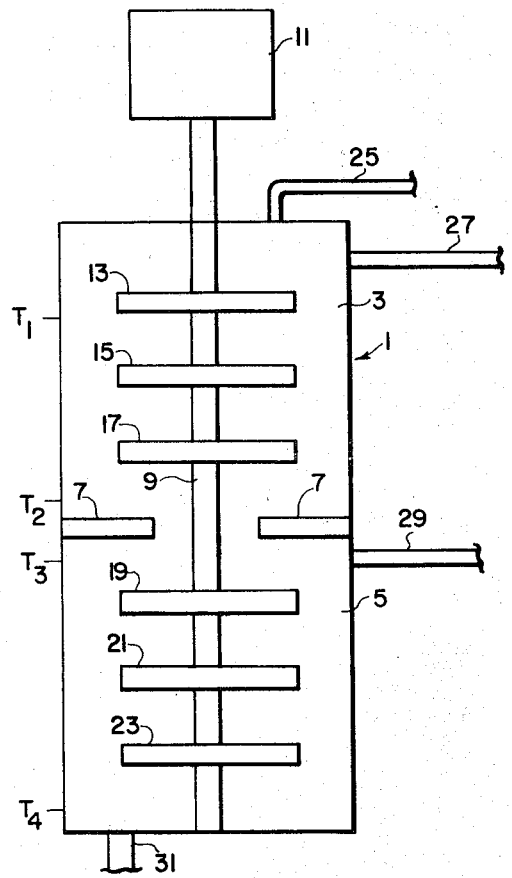

ABSTRACT OF THE DISCLOSURE

A two-reaction zone process for preparing polyethylene employing two different peroxide catalysts. The polyethylene feed stock contains a controlled amount of propane, heptane and impurities. The process produces a novel polyethylene having a density of about 0.924 to about 0.926 which finds particular utility for extrusion coating substrates. The extrusion coated substrates have improved heat sealability and chill roll release. The novel polyethylene is also capable of being extruded into thin gauge blown film at high extrusion rates to form films having poor optical properties.

---

This invention relates to a novel process for preparing polyethylene having an unexpected and improved combination of properties. One aspect of this invention relates to a process for producing a particular polyethylene resin having properties that make the resin particularly useful for extrusion coating operations. Another specific aspect of this invention relates to novel polyethylene capable of forming extrusion coatings having improved heat sealability and chill roll release. A further specific aspect of the invention relates to a novel polyethylene capable of forming thin blown films having a novel combination of properties.

Polyethylene has been described rather extensively in the literature, and has been produced commercially in a variety of processes to produce polyethylenes having distinct properties. These different types of polyethylene have been separately classified and distinguished primarily by the density of the polymer. The first type of polyethylene that was produced commercially was of the so-called low-density type. This polyethylene has been produced for some years in accordance with the process described by Fawcett et al. in U.S. Pat. 2,153,553. This low-density form of polyethylene is usually regarded as having a density within the range of 0.90 to 0.935 and because of the high content of amorphous polymer, this type of polyethylene has relatively low hardness, low stiffness and low melting point when compared with more highly crystalline ethylene polymers.

Higher density types of polyethylene have been made and described in the literature. For example, it is known that a medium density polyethylene having a density within the range of about 0.935 to 0.945 can be produced. In recent years, it has also been discovered that a higher density and more highly crystalline type of ethylene polymer can be prepared. This high-density polymer usually has a density within the range of about 0.945 to 0.975 and higher.

The unique properties of polyethylene have made this polymer particularly useful for extrusion coating operations, and for such uses the low density form of polyethylene as contrasted with the medium and high density forms of polyethylene has been found to be the most desirable type. Low density polyethylene can be extruded as a film onto a sheet-like substrate such as paper or cardboard. However, prior to this invention, prior art low density polyethylene, while finding acceptance in extrusion coating operations, is known to be deficient in some of its properties for use in this field. One such deficiency is that the prior art low density polyethylene extrusion coatings do not possess the desired heat sealability and chill roll release desirable for some uses in the packaging field. Numerous attempts have been made by those skilled in the art to improve the heat sealability and chill roll release of low density polyethylene extrusion coatings, but none of these attempts have provided coatings having the combination of properties provided by polyethylene prepared according to this invention. Also, films for certain applications require a particular combination of physical properties. The polyethylene produced according to the present invention can be formed into blown film having acceptable drawn down rates to form film having a thickness of 1 mil or less. These films have the unique combination of low gloss, high haze and good strength.

It is an object of this invention to provide a novel process for producing polyethylene having a density below 0.930 capable of forming extrusion coatings having improved heat sealability.

Another object of this invention is to provide a process for preparing polyethylene having a density below 0.930 capable of forming extrusion coatings having improved chill roll release.

It is still a further object of this invention to provide a process for preparing polyethylene capable of being formed in blown films having a thickness of less than 1 mil having poor optical properties.

Further objects of this invention will be apparent from the following description of the invention.

In accordance with this invention, it has been found that polyethylene having a density of about 0.924 to about 0.926 can be prepared by polymerizing ethylene feed stock comprising ethylene and about 0.40 to about 1.2 weight percent n-heptane, about 0.4 to about 2.6 volume percent propane and about 0.5 to about 1.8 volume percent of impurities selected from the group consisting of methane, ethane, propylene and carbon dioxide in a two-zone reactor. The two-zone reactor has a top reaction zone and a bottom reaction zone. The ethylene feed stock is introduced in the upper portion of the top reaction zone and polymerized at a temperature of about 175 to 205° C. using decanoyl peroxide as a catalyst. The reaction mixture from the top reaction zone is then introduced into the bottom reaction zone and polymerized at a temperature of about 250 to 274° C. using as a catalyst ditertiary butyl peroxide. The polyethylene is capable of being formed into extrusion coatings on sheet-like substrates. These extrusion coatings have excellent heat sealability and chill roll release properties. Also, the polyethylene is capable of forming blown films having a thickness of 1 mil or less having a unique combination of poor optical properties.

In practicing the invention, ethylene is polymerized in two distinct reaction zones, using at least two different catalysts. Also different reaction temperatures are employed in each reaction zone. One such process can be conducted in a single reactor having separate reaction zones separated by a baffle or other separation means. It is preferable to employ an elongated reactor separated into two distinct reaction zones by a baffle and having a stirring or agitating mechanism extending through the two reaction zones. This agitating means is important to provide excellent mixing of the ethylene, catalyst and polymerized ethylene in order to obtain the maximum amount of reaction with a minimum amount of catalyst. In order to obtain this type of agitation, it is preferable that the agitator shaft extends through the center of the reactor. However, the two separate reactions carried out in the two reaction zones can be carried out in separate interconnected reactors.

It is necessary that the ethylene feed stock contain ethylene and about 0.40 to about 1.2, preferably about 0.5 to about 0.7 weight percent, n-heptane, about 0.4 to about 2.6, preferably about 0.5 to 0.9, volume percent propane and about 0.5 to about 1.8, preferably 0.6 to 1.2, volume percent impurities of the group consisting of methane, ethane, propylene and carbon dioxide. The ethylene feed stock contains in varying amounts propane, propylene, methane, ethane, and carbon dioxide which are formed during the cracking of propane to form ethylene. The cracking of propane to form ethylene is well known in the art and can be carried out in one particular process by the thermal cracking of propane. The amount of propane, ethane, methane, propylene and carbon dioxide present in the ethylene feed stock obtained from the cracking process can be determined by gas chromatographic analysis and, if necessary, additional amounts of propane, ethane, methane, propylene and carbon dioxide can be added to the ethylene feed stock to provide the required amounts of propane and the impurities of the group consisting of ethane, methane, propylene and carbon dioxide to the ethylene feed stock for polymerizing in the reactor. Some of the n-heptane can be added to the reactor as the catalyst solvent for the top reaction zone catalyst. The amount of n-heptane present in the ethylene feed stock can also be determined by gas chromatographic analysis, and if necessary additional n-heptane can be added to the ethylene feed stock to provide the required amount of n-heptane in the ethylene feed stock. It is desirable and economical to recycle unreacted ethylene to the polymerization reaction, and when the process is practiced over an extended period of time, n-heptane, propane as well as methane, ethane, propylene and carbon dioxide tend to accumulate in the recycle ethylene stream. Regular purging of the ethylene recycle line is therefore necessary in order to maintain the desired concentration of propane, n-heptane and methane, ethane, propylene and carbon dioxide.

In conducting the polymerization reaction, decanoyl peroxide, the top reaction zone catalyst, can be introduced into the reactor in solution in a suitable solvent or diluent. The organic solvent or diluent employed in the top reaction zone can be an aliphatic alkane, such as pentane, hexane, n-heptane, or a higher molecular weight liquid paraffin or mixture of paraffins. The preferred solvent is n-heptane. Since the process requires that the ethylene feed stock polymerized in the reactor contain a particular amount of n-heptane, the use of n-heptane as the catalyst solvent provides a convenient method of adding n-heptane to the reactor. The carrier for ditertiary butyl peroxide, the bottom reaction zone catalyst, is preferably white mineral oil, although other solvents and diluents can be used. The ethylene feed stock is preferably fed to the top reaction zone at a temperature of about 15 to about 65° C., most preferably at a temperature of about 25 to about 45° C. The temperature of the upper portion of top reaction zone is maintained at about 175 to 185° C., and the lower portion is maintained at about 175 to about 205° C. The temperature of the upper portion of the bottom reaction zone is maintained at about 250 to about 258° C. and the lower portion is maintained at a temperature of about 265 to about 274° C. The temperature of the reaction zones is maintained within these ranges by adjusting the amount of catalyst fed to the reactor.

Within the specified reaction ranges the molecular weight or melt index of the polymer produced can be controlled by reaction pressure. For example, the melt index can be varied from about 1.7 to about 10 by increasing the ethylene feed stock pressure to the top reaction zone from about 1300 to about 1550 atmospheres. Higher or lower melt indexes can be obtained by using higher or lower feed stock pressures.

The following examples are included for a better understanding of the invention.

EXAMPLE 1

The attached figure is a diagrammatic drawing of a two-zone reactor that can be employed in our process. Reactor 1 is separated into top reaction zone 3 and the lower reaction zone 5 by baffle 7. The reactor is provided with an agitator 9 driven by any suitable means, such as motor 11, and the shaft of agitator 9 in top reaction zone 3 is provided with three paddle blades 13, 15 and 17 spaced equidistantly in top reaction zone 3. The shaft of agitator 9 in the lower reaction zone 5 is provided with three paddle blades 19, 21 and 23 spaced equidistantly apart. During the polymerization, ethylene feed stock comprising ethylene and controlled amounts of propane, n-heptane, and impurities of the group consisting of ethane, methane, propylene and carbon dioxide is fed to top reaction zone 3 via line 25. Decanoyl peroxide in n-heptane enters the top reaction zone via line 27. Ditertiary butyl peroxide in white mineral oil enters the lower reaction zone via line 29. The desired temperature profile for the reaction is maintained by observing the temperatures at points designated at $T_1$, $T_2$, $T_3$ and $T_4$. The reaction product is removed from the lower reaction zone 5 via line 31, and the solid reaction product is then separated from the reaction mixture. Unreacted ethylene can be recovered from the reaction mixture and recycled to reactor 1.

Ethylene feed stock containing 0.84 volume percent propane, 0.005 volume percent methane, 0.33 volume percent ethane, 0.21 volume percent carbon dioxide and 0.65 weight percent n-heptane is compressed to 1390 atmospheres and fed to the top reaction zone at a temperature of about 35° C. and a feed stock rate of 22,000 pounds per hour. About 10.0 pounds per hour of decanoyl peroxide is fed to the top reaction zone as a 25 percent solution in n-heptane. Temperatures $T_1$ and $T_2$ are held at 178° C. and 198° C., respectively. About 0.25 pounds per hour of ditertiary butyl peroxide is fed into the bottom reaction zone as a 10 percent slurry in white mineral oil. Temperatures $T_3$ and $T_4$ are held at 255° C. and 269° C., respectively.

The polymer and unreacted ethylene are led from the reactor bottom zone to a conventional separator operated at 250 atmospheres and, after separation of solid polymer, unreacted ethylene is recycled. The molten polymer is then passed to an extrusion hopper and pelleted.

Table 1 compares extrusion coated milk carton stock which was made into one-half gallon milk cartons using an Excello Pure Pak milk carton machine. The polyethylene produced according to Example 1, Run 1, provided cartons having better heat sealability than a prior art blend, Run 2, having approximately the same melt index and density. The Run 2 blend was obtained by blending 85%, by weight, polyethylene having a density of 0.919 with 15%, by weight, polyethylene having a density of about 0.969. In Run 3 the process of Example 1 is repeated except that the ethylene feed stock did not contain propane. In Run 4, three-fourths of the ethylene feed stock was added to the top reaction zone and one-fourth added to the bottom reaction zone. Also in Run 4 diisopropyl peroxydicarbonate was used as the top reaction zone catalyst.

TABLE I

|  | Run 1 | Run 2 | Run 3 | Run 4 |
|---|---|---|---|---|
| Melt index | 4.3 | 4.5 | 1.6 | 3.5 |
| Density | 0.925 | 0.926 | 0.922 | 0.924 |
| Average number of cartons leaking, percent | 4 | 48 | 24 | 30 |

This test is a standard test to determine heat sealability. One hundred half-gallon milk cartons are filled with milk. On standing for approximately one hour, a visual count is made of the number of cartons from which the milk has leaked through the 180° bottom fold.

Table 2 compares the extrusion coating rates of the polyethylene of Example 1 with similar polyethylene. It is necessary that polyethylene used in extrusion coating operations have a sufficient chill roll release to permit extrusion coating speeds fast enough for commercial operations. Run 1 is the polyethylene of Example 1. Run 2 polyethylene was prepared by repeating Run 1 except that diisopropyl peroxy dicarbonate was used as the top reaction zone catalyst and ¾ of the ethylene feed stock was introduced to the top reaction zone and the remaining feed stock fed to the bottom reaction zone. Run 3 was similar to Run 2 except that tertiary butyl peroxy pivalate was substituted for diisopropyl peroxy dicarbonate as the top reaction zone catalyst. Run 4 was prepared according to Run 1 except that caprylyl peroxide was used in place of decanoyl peroxide.

Run 5 was prepared using tertiary butyl peroxyisobutyrate as the catalyst in the top reaction zone and also by adding one-half of the ethylene feed stock to each zone. In the comparison in Table II it is shown that the polyethylene of the present invention has the extrusion coating speed necessary for commercial operations.

TABLE II

|  | Extrusion coating speed without tearing from die, feet/minute |
|---|---|
| Run 1 | >1600 |
| Run 2 | 975 |
| Run 3 | 1000 |
| Run 4 | 825 |
| Run 5 | 1275 |

EXAMPLE 2

The process of Example 1 is repeated with the following modifications. The ethylene feed stock contains 1.60 volume percent propane. 0.07 volume percent methane, 0.34 volume percent ethane, 0.37 volume percent carbon dioxide and 0.75 weight percent n-heptane. The feed stock was compressed to 1525 atm. and fed to the top reaction zone at a temperature of 45° C. The feed gas rate was 22,000 pounds per hour. The polymerization temperature of the upper portion of the top reaction zone is about 178° C. and the lower portion temperature is about 195° C. The bottom reaction zone temperature in the upper portion is about 257° C. and the lower portion is 267° C.

In Table 3, Run 1 compares polyethylene prepared according to Example 1, with polyethylene produced by a similar process condition. Run 2 is polyethylene prepared according to Run 1 except that diisopropyl peroxydicarbonate is employed in place of decanoyl peroxide as top reaction zone catalyst. Run 3 polyethylene is produced in a one-zone process by introducing both ethylene feed stock and catalyst, ditertiary butyl peroxide, into the top and bottom of the reaction zone.

TABLE III

|  | Run 1 | Run 2 | Run 3 |
|---|---|---|---|
| Melt index (ASTM D-1238) | 4.0 | 3.8 | 4.5 |
| Density (ASTM D-1505) | 0.925 | 0.925 | 0.918 |
| Film properties [1]: |  |  |  |
| Haze (ASTM D-1003) | 18 | 10 | 13 |
| Gloss (ASTM 3-346-59) | 30 | 43 | 52 |
| Transparency (ASTM D-1746) | 12 | 14 | 24 |
| Drawdown, for 2 minute test: |  |  |  |
| Speed f.p.m. | 175 | 160 | 115 |
| Thickness, mils | 0.46 | 0.50 | 0.70 |
| For 30 minutes test: |  |  |  |
| Speed f.p.m. | 150 | 120 |  |
| Thickness, mil | 0.53 | 0.67 |  |

[1] Properties measured on blown film of 1 mil thickness prepared by extrusion on a 2½ inch National Rubber Machine extruder using a circular 4-inch die at a temperature of 160° C. and a film extrusion speed of 80 feet per minute.

As shown by Table III, polyethylene produced according to the present invention is capable of forming films having a combination of properties desirable in particular applications. For example, the polyethylene is capable of being formed into blown opaque film having a thickness of less than 1 mill that is desirable for particular applications, such as backing for disposable diapers. Also, Table III shows that the film can be formed at commercially acceptable speeds.

The process of the present invention provides polyethylene having a unique and unobvious combination of properties. The polyethylene is capable of forming extrusion coatings having improved heat sealability. Also, the polyethylene can be formed into blown opaque film.

Although the invention has been described in considerable detail with particular reference to certain preferred embodiments thereof, variations and modifications can be effected within the spirit and scope of the invention as described hereinabove and as defined in the appended claims.

We claim:

1. A process for preparing polyethylene having a density of about 0.924 to about 0.926 which comprises polymerizing ethylene feed stock comprising ethylene and about 0.40 to about 1.2 weight percent n-heptane, about 0.4 to about 2.6 volume percent propane and about 0.5 to about 1.8 volume percent of impurities selected from the group consisting of methane, ethane, propylene and carbon dioxide in a two-zone reactor having a top reaction zone and a bottom reaction zone, all of said ethylene feed stock being introduced in the upper portion of said top reaction zone and polymerized at a temperature of about 175° to 205° C. using decanoyl peroxide as a catalyst, the reaction mixture being passed from said top reaction zone to said bottom reaction zone and polymerized at a temperature of about 250 to 274° C. using as a catalyst ditertiary butyl peroxide.

2. A process according to claim 1 wherein said ethylene feed stock comprises ethylene and about 0.5 to about 0.7 weight percent n-heptane, about 0.5 to about 0.9, volume percent propane and about 0.6 to about 1.2 volume percent of impurities selected from the group consisting of methane, ethane, propylene and carbon dioxide.

3. A process according to claim 2 wherein said ethylene feed stock is introduced into said top reaction zone at a temperature of about 15 to about 65° C.

4. A process according to claim 3 wherein said top reaction zone polymerization temperature is from about 182° to about 200° C.

5. A process according to claim 4 wherein said bottom reaction zone polymerization temperature is from about 257 to about 272° C.

6. A process according to claim 1 wherein said ethylene feed stock comprises ethylene and about 0.8 to about 1.1 weight percent n-heptane, about 0.9 to about 1.6 volume percent propane, and about 0.8 to about 1.6 volume percent of impurities selected from the group consisting of methane, ethane, propylene and carbon dioxide.

7. A process according to claim 6 wherein said ethylene feed stock is introduced into said top reaction zone at a temperature of about 15 to about 65° C.

8. A process according to claim 7 wherein said top reaction zone polymerization temperature is from about 178 to about 198° C.

9. A process according to claim 8 wherein said bottom reaction zone polymerization temperature is from about 252 to about 269° C.

References Cited

UNITED STATES PATENTS

| | | | |
|---|---|---|---|
| 2,921,059 | 1/1960 | Guillet et al. | 260—94.9 |
| 2,932,632 | 4/1960 | Barry et al. | 260—94.9 |
| 2,964,515 | 12/1960 | Rader | 260—94.9 |
| 3,119,803 | 1/1964 | Horkowitz | 260—94.9 |
| 3,178,404 | 4/1965 | Vaughn et al. | 260—94.9 |
| 3,293,233 | 12/1966 | Erchak et al. | 260—94.9 |
| 3,373,148 | 3/1968 | Mackie et al. | 260—94.9 |

FOREIGN PATENTS 1,264,148 5/1961 France.

JOSEPH L. SCHOFER, Primary Examiner

E. J. SMITH, Assistant Examiner